March 7, 1944.　　　J. JANDASEK　　　2,343,509
TRANSMISSION
Filed May 28, 1941
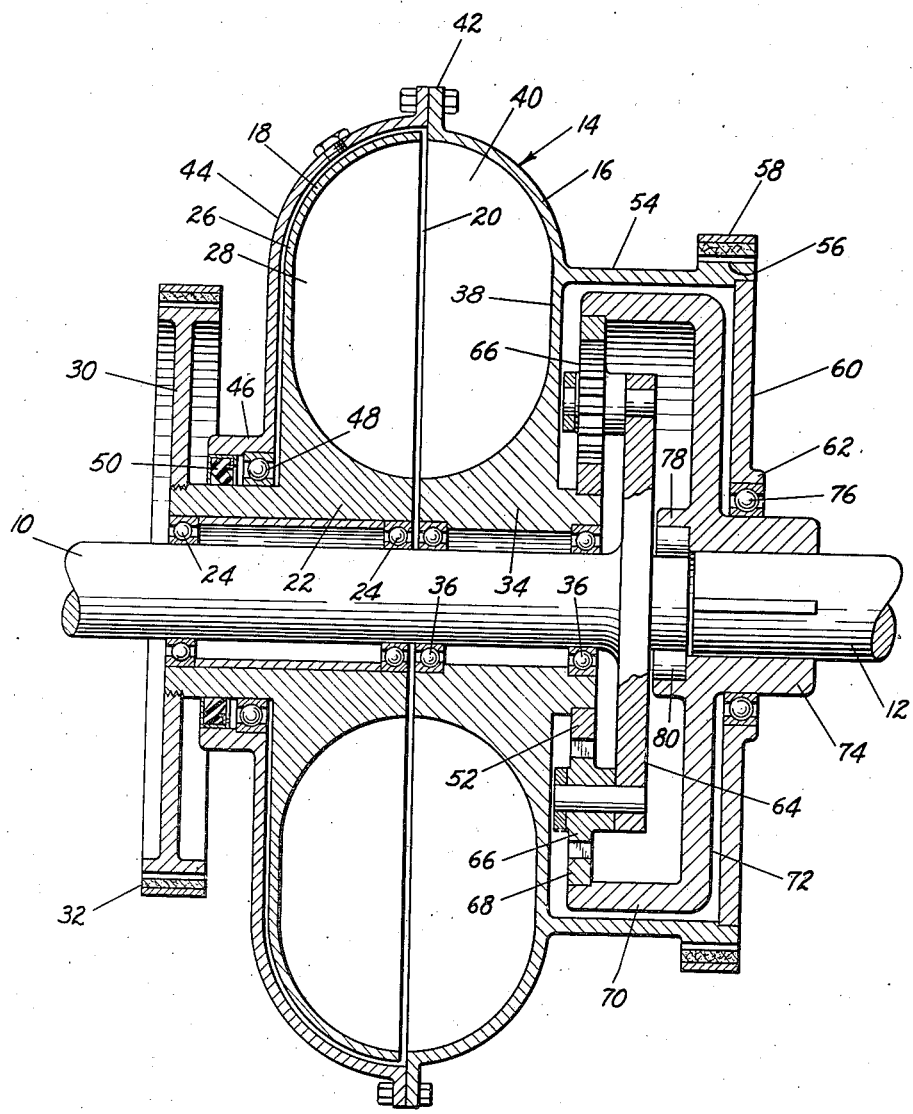
INVENTOR.
JOSEPH JANDASEK
BY
O. H. Fowler
ATTORNEY Patented Mar. 7, 1944

2,343,509

UNITED STATES PATENT OFFICE 2,343,509

TRANSMISSION

Joseph Jandasek, Detroit, Mich., assignor to Bendix Aviation Corporation, Detroit, Mich., a corporation of Delaware Application May 28, 1941, Serial No. 395,668

8 Claims. (Cl. 74—189.5)

This invention relates to transmissions.

Broadly the invention comprehends a transmission including a direct drive, an overdrive, and a flexible connection in the overdrive.

An object of the invention is to provide a transmission having a direct drive, an overdrive, and means connected in the overdrive for smoothing the operation thereof and for inhibiting shock.

Other objects and advantages of the invention will appear from the following description taken in connection with the drawing forming a part of this specification, and in which—

The drawing is a comprehensive view, largely in section, and partly in elevation, of a turbo drive embodying the invention.

Referring to the drawing for more specific details of the invention, 10 represents a driving shaft adapted to be coupled to the crank shaft of an internal combustion engine, not shown, and 12 represents a driven shaft suitably supported in axial alignment with the driving shaft.

A fluid brake indicated generally at 14 is journaled on the driving shaft. This brake includes an impeller 16 and a turbine 18 providing in conjunction with one another a vortex chamber 20 for the circulation of fluid.

As shown, the turbine 18 includes a hub 22 supported for rotation on suitable spaced bearings 24 fitted on the driving shaft 10, and the hub has a web 26 supporting vanes 28. The hub 22 also has thereon a drum 30, and a friction brake 32 is associated with the drum.

The impeller 16 includes a hub 34 supported for rotation on suitable spaced bearings 36 arranged on the driving shaft 10, and the hub has a web 38 supporting blades 40 in oppositely disposed relation to the vanes 28. The web 38 has a peripheral flange 42, and suitably secured to this flange is a housing 44 arranged in spaced relation to the back of the turbine. The housing 44 has a hub 46 sleeved over the hub 22 of the turbine, and interposed between the hubs 22 and 46 is a suitable bearing 48 and also a sealing member 50, the latter inhibiting seepage of fluid from the housing.

The hub 34 of the impeller has suitably secured thereto a sun gear 52, the purpose of which will hereinafter appear, and a cylindrical housing 54 extended from the web 38 in concentric relation to the sun gear 52 has thereon a braking surface 56 for cooperation with a brake 58, and suitably secured to the housing 54 is a closure plate 60 having a bearing support 62.

The driving shaft 10 extends into the housing 54, and the shaft has thereon within the housing a substantial flange 64 supporting for rotation spaced planet pinions 66 in mesh with the sun gear 52, and a ring gear 68 suitably secured to a flange 70 on a web 72 supported on a hub 74 keyed or otherwise fixedly secured to the driven shaft within the housing 54. The hub 74 extends through the bearing support 62, and interposed between the bearing support 62 and hub 74 is a suitable bearing 76. The hub 74 also has a concentrically disposed flange 78 for the reception of the adjacent end of the driving shaft 10, and a suitable one-way clutch 80 is interposed between the shaft 10 and the flange.

In a normal operation, direct drive is attained by force transmitted from the driving shaft 10 through the one-way clutch 80 to the driven shaft 12. During this operation, the fluid brake 14 is idling. When it is desired to effect an overdrive, the brake 32 is set or applied to secure the turbine 18 against movement. This results in bringing into play the impeller 16 through the medium of the sun gear 52 driven by the planet pinions 66 on the flange 64 of the driving shaft 10, and transmission of force to the ring gear 68 in mesh with the planet pinions 66 and the consequent transfer of force from the ring gear through the web 72 on the hub 74 of the driven shaft 12.

The fluid brake 14 serves as an efficient cushion since it provides for adequate slip between the stationary turbine and the rotating impeller, serving to yieldingly restrain the sun gear 52. The overdrive is most efficient for relative high speeds. When it is desired to attain top speed, the brake 58 is applied to lock the fluid brake 14 against movement. Under this condition, a strictly mechanical drive with increased ratio of speed is obtained. During this operation, force is transmitted from the driven shaft 10 through the planetary gear comprising gears 52, 66 and 68 to the web 72 on the hub 74 secured to the driven shaft 12.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising driving and driven shafts, a one-way drive connected between the shafts, means providing for increased ratio of speed connecting the shafts, means providing yielding resistance to one member of the increased ratio of speed means, and means for holding the member against movement.

2. A transmission comprising driving and driven shafts, means coupling the shafts for forward drive, means coupling the shafts providing for increase in speed of the driven shaft, and a fluid brake connected to the latter coupling independent control means for the fluid brake providing different stages of overdrive.

3. A transmission comprising driving and driven shafts, means providing direct drive therebetween, means coupling the shafts providing for increase in speed of the driven shaft, and means connected in the latter coupling for absorbing shock and providing multi-stage overdrive including a fluid energizing element and a fluid energy absorbing element, and a brake for each of the elements.

4. A transmission comprising driving and driven shafts, means providing for direct drive therebetween, a gearing system coupling the shafts for increase in speed of the driven shaft, a fluid brake connected to the gearing system, and dual control means for the fluid brake and gearing system to effect moderate overdrive and maximum overdrive.

5. A transmission comprising a driving shaft, a driven shaft, a one-way drive therebetween, a fluid brake having cooperative elements supported on the driving shaft, planetary gearing coupling the shafts and connected to one of the cooperative elements, and selective means for independent control of the cooperative elements.

6. A transmission comprising a driving shaft, a driven shaft, a one-way drive therebetween, a planetary gearing system connecting the shafts, a fluid brake connected to the planetary gearing system, including an impeller and a turbine, and brakes for control of the gearing system and fluid brake.

7. A transmission comprising a driving shaft, a driven shaft and a one-way drive connecting the shafts, a planetary gearing system connected between the shafts, a fluid power transmitting unit including an impeller and a turbine connected to the gearing system, means for control of the turbine to effect a variable overdrive, and means for control of the gearing system and impeller to attain the maximum increased ratio of speed between the driving and driven shafts.

8. A transmission comprising driving and driven shafts, a direct drive means coupling the shafts, a gearing system coupling the shafts, fluid energizing means connected to the gearing system, means for absorbing energy from the fluid, and means for control of the energizing and energy absorbing means.

JOSEPH JANDASEK.